(12) United States Patent
Iwamura et al.

(10) Patent No.: US 8,155,675 B2
(45) Date of Patent: Apr. 10, 2012

(54) BROADCAST INFORMATION TRANSMISSION METHOD, RADIO BASE STATION AND MOBILE STATION

(75) Inventors: Mikio Iwamura, Yokohama (JP);
Minami Ishii, Yokohama (JP)

(73) Assignee: NTT Docomo, Inc., Tokyo (JP)

( * ) Notice: Subject to any disclaimer, the term of this patent is extended or adjusted under 35 U.S.C. 154(b) by 16 days.

(21) Appl. No.: 12/678,794

(22) PCT Filed: Sep. 18, 2008

(86) PCT No.: PCT/JP2008/066861
§ 371 (c)(1),
(2), (4) Date: Jun. 8, 2010

(87) PCT Pub. No.: WO2009/038129
PCT Pub. Date: Mar. 26, 2009

(65) Prior Publication Data
US 2010/0285796 A1    Nov. 11, 2010

(30) Foreign Application Priority Data

Sep. 18, 2007  (JP) ................ P2007-241652

(51) Int. Cl.
*H04W 68/00* (2009.01)
(52) U.S. Cl. .............. 455/458; 455/422.1; 455/414.1; 455/418
(58) Field of Classification Search ............ 455/458, 455/422.1, 414.1, 418
See application file for complete search history.

(56) References Cited

U.S. PATENT DOCUMENTS 7,586,864 B2 * 9/2009 Aoki .................... 370/318
2005/0195852 A1   9/2005 Vayanos et al.
2005/0232139 A1 * 10/2005 Balakrishnan et al. ...... 370/208

FOREIGN PATENT DOCUMENTS

JP   2007-522776 A   8/2007
WO   2006/016785 A1  2/2006

OTHER PUBLICATIONS

3GPP TS 36.300 V8.1.0, "Evolved Universal Terrestrial Radio Access (E-UTRA) and Evolved Universal Terrestrial Radio Access Network (E-UTRAN)," Jun. 2007, 106 pages.
Ericsson, "Transmission of dynamic system information," 3GPP TSG-RAN2 Meeting #59, R2-073236, Aug. 20-24, 2007, 4 pages.
Panasonic, et al., "RLC mode for System information delivery," 3GPP TSG RAN WG2 #58bis, R2-072660, Jun. 25-29, 2007, 2 pages.
International Search Report issued in PCT/JP2008/066861, mailed on Dec. 22, 2008, with translation, 3 pages.
Written Opinion issued in PCT/JP2008/066861, mailed on Dec. 22, 2008, 4 pages.

* cited by examiner

*Primary Examiner* — Nghi Ly
(74) *Attorney, Agent, or Firm* — Osha Liang LLP

(57) ABSTRACT

A radio base station (eNB) transmits a change notification to the plurality of mobile stations (UE), when repeatedly transmitting the plurality of segments, and when having changed a content of the broadcast information formed of the plurality of segments, size of each of the plurality of segments or subframes in which the plurality of segments are to be transmitted, the change notification indicating the change. The mobile station (UE) receives all the plurality of segments again, when having failed to receive only some of the plurality of segments, and when having received the change notification.

4 Claims, 7 Drawing Sheets

FIG. 4
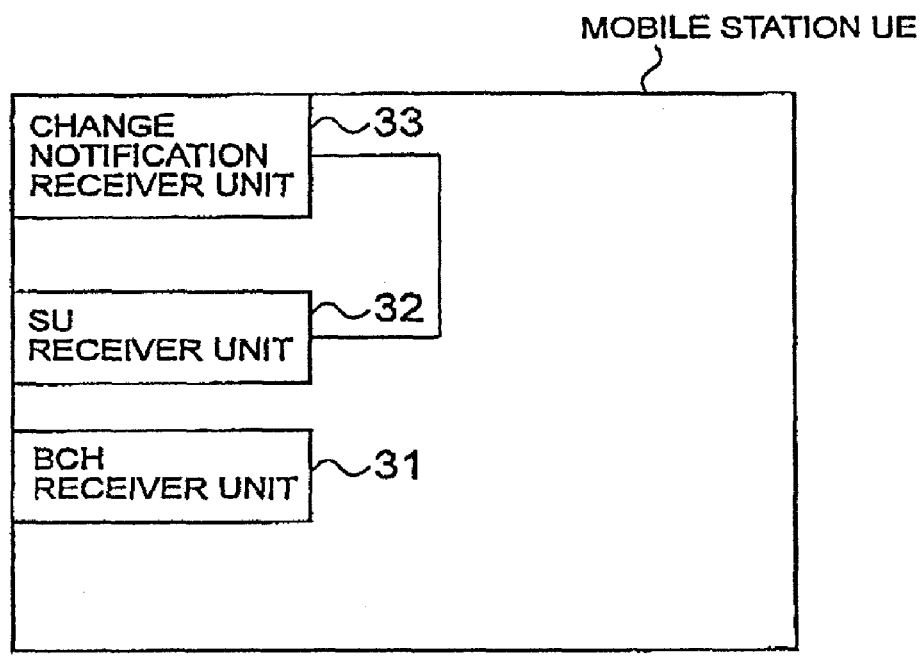
FIG. 5
(a)
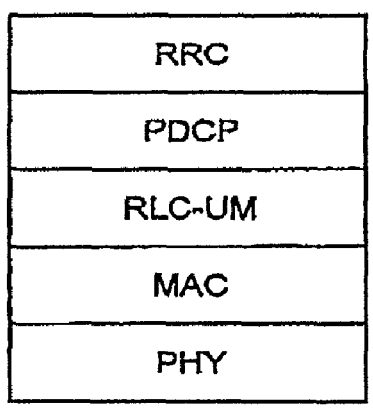
(b)
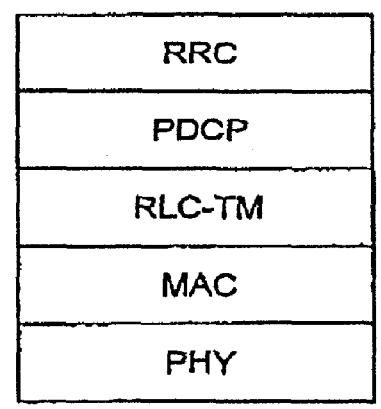

BROADCAST INFORMATION TRANSMISSION METHOD, RADIO BASE STATION AND MOBILE STATION

TECHNICAL FIELD

The present invention relates to: a broadcast information transmission method in which a radio base station divides broadcast information into multiple segments and repeatedly transmits the multiple segments to multiple mobile stations by using multiple subframes; a radio base station; and a mobile station.

BACKGROUND ART

With reference to FIG. 8 and FIG. 9, description is given of operation (broadcast information transmission method) in which a radio base station eNB divides broadcast information (BCCH: Broadcast Control Channel) into multiple segments (SU: Scheduling Units) and repeatedly transmits the multiple segments to multiple mobile stations UE by using multiple subframes, in a mobile communication system of the LTE (Long Term Evolution) system.

As shown in FIG. 8, a BCCH (broadcast information) can be transmitted by being mapped to a BCH (Broadcast Channel) and a PDSCH (Physical Downlink Shared Channel).

The radio base station eNB is configured to repeatedly transmit the BCH four times to each of the multiple mobile stations UE, by using six radio resource blocks (RB: Resource Block) in a middle part of the bandwidth of a corresponding cell, in a first subframe (subframe #0) of each radio frame.

Here, the radio base station eNB is configured to transmit basic information such as a physical parameter (cell bandwidth or the like), a system frame number (SFN: System Frame Number) and Value Tag, by the BCH.

In addition, the radio base station eNB transmits SU-1 including broadcast information (BCCH) not mapped to the BCH, in a predetermined subframe (e.g., subframe #5) by a PDSCH (Physical Downlink Shared Channel).

Here, the radio base station eNB is configured to transmit scheduling information of each SU (called a different SU, below) subsequent to a SU-1 (e.g., the size of the different SU, subframes in which the different SU is to be transmitted, the cycle in which the different SU is to be transmitted, and the like), by the SU-1.

Moreover, the radio base station eNB is configured to transmit the different SUs in accordance with the scheduling information specified by the SU-1.

In addition, as shown in FIG. 9, the radio base station eNB is configured to divide each different SU into multiple segments #1 to #3 and sequentially transmit the multiple segments #1 to #3 by subframes in a Window, if the different SU cannot be transmitted in 1 TTI (Transmission Time Interval).

For example, as shown in FIG. 9, the radio base station eNB is configured to transmit the different SU, by subframes #X, #X+1 and #X+n in the Window.

However, in the conventional mobile communication system of the LTE system, the radio base station eNB can change subframes to which the multiple segments #1 to #3 are mapped and the size of each of the multiple segments #1 to #3 (segmentation method for the corresponding different SU), when repeatedly transmitting the multiple segments #1 to #3.

Accordingly, there is a possibility that the multiple segments #1 to #3 may have been changed in mapped subframe and size while being repeatedly transmitted. Hence, a problem arises that, even when failing to receive only one or some of the multiple segments, each mobile station UE cannot receive only the one or some segments failed to be received.

Non-patent Document 1: 3GPP TS36.300, "E-UTRA and E-UTRAN; Overall description; Stage 2", v8.1.0.
Non-patent Document 2: 3GPP R2-073236, "Transmission of dynamic system information", Ericsson.
Non-patent Document 3: 3GPP R2-072660, "RLC mode for system information delivery", Panasonic, NTT DoCoMo.

DISCLOSURE OF THE INVENTION

The present invention has been made in view of the above-described problem, and is aimed to provide a broadcast information transmission method, a radio base station and a mobile station which enable the following. When the radio base station repeatedly transmits multiple segments to multiple mobile stations by using multiple subframes and any of the mobile stations fails to receive one or some of the multiple segments, the mobile station can efficiently receive only the one or some segments failed to be received.

A first aspect of the present invention is summarized as a broadcast information transmission method in which a radio base station divides broadcast information into a plurality of segments and repeatedly transmits the plurality of segments to a plurality of mobile stations by using a plurality of subframes, the broadcast information transmission method including the steps of: transmitting, at the radio base station, a change notification to the plurality of mobile stations, when repeatedly transmitting the plurality of segments, and when having changed a content of the broadcast information formed of the plurality of segments, size of each of the plurality of segments or subframes in which the plurality of segments are to be transmitted, the change notification indicating the change; and receiving, at the mobile station, all the plurality of segments again, when having failed to receive only some of the plurality of segments, and when having received the change notification.

A second aspect of the present invention is summarized as a radio base station configured to divide broadcast information into a plurality of segments and repeatedly transmit the plurality of segments to a plurality of mobile stations by using a plurality of subframes, the radio base station including: a change notifying unit configured to transmit a change notification to the plurality of mobile stations, when the radio base station repeatedly transmits the plurality of segments, and when the radio base station has changed a content of the broadcast information formed of the plurality of segments, size of each of the plurality of segments or subframes in which the plurality of segments are to be transmitted, the change notification indicating the change.

In the second aspect, at a timing of transmitting a paging signal to the plurality of mobile stations, the change notifying unit can be configured to transmit scheduling information of a shared data channel for transmitting the paging signal, by a control channel including a radio network identifier for the paging signal, and to transmit the change notification together with the paging signal, by the shared data channel transmitted in a radio resource specified by the scheduling information.

In the second aspect, at a timing of transmitting a paging signal to the plurality of mobile stations, the change notifying unit can be configured to transmit the change notification together with scheduling information of a shared data channel for transmitting the paging signal, by a control channel having a specific format including a radio network identifier for the paging signal.

In the second aspect, at a timing of transmitting a paging signal to the plurality of mobile stations, the change notifying unit can be configured to transmit scheduling information of a shared data channel for transmitting the change notification, by a control channel including a radio network identifier for the change notification different from a radio network identifier for the paging signal, and to transmit the change notification, by the shared data channel transmitted by a radio resource specified by the scheduling information.

In the second aspect, at a timing of transmitting a paging signal to the plurality of mobile stations, the change notifying unit can be configured to transmit the change notification, by a control channel including a radio network identifier for the change notification different from a radio network identifier for the paging signal.

In the second aspect, the change notification transmitted when a change is made to the size of each of the plurality of segments or the subframes in which the plurality of segments are to be transmitted, can be different from the change notification transmitted when a change is made to the content of the broadcast information formed of the plurality of segments.

A third aspect of the present invention is summarized as a mobile station configured to repeatedly receive a plurality of segments from a radio base station by using a plurality of subframes, the plurality of segments being obtained by dividing broadcast information, the mobile station including: a change notification receiver unit configured to receive a change notification from the radio base station, when the radio base station repeatedly transmits the plurality of segments, the change notification indicating that a change has been made to size of each of the plurality of segments or subframes in which the plurality of segments are to be transmitted; and a segment receiver unit configured to receive again all the plurality of segments, when the segment receiver unit has failed to receive only some of the plurality of segments, and when the change notification receiver unit has received the change notification.

In the third aspect, the segment receiver unit can be configured to receive again only some of the plurality of segments, when the change notification receiver unit has not received the change notification, and when the segment receiver unit has failed to receive only some of the plurality of segments.

In the third aspect, the change notification can be different from a change notification transmitted when a content of the broadcast information is changed.

In the third aspect, the segment receiver unit can be configured to receive again all the plurality of segments forming the broadcast information corresponding to a state of the mobile station or a technology supported by the mobile station, when the segment receiver unit has failed to receive only some of the plurality of segments, and when the change notification receiver unit has received the change notification.

BRIEF DESCRIPTION OF THE DRAWINGS

FIG. 4 is a functional block diagram of a mobile station according to the first embodiment of the present invention.

FIG. 5 provides views each showing a protocol stack of the mobile station according to the first embodiment of the present invention.

BEST MODE FOR CARRYING OUT THE INVENTION (Configuration of Mobile Communication System according to First Embodiment of Present Invention)

With reference to FIG. 1 to FIG. 5, a configuration of a mobile communication system according to a first embodiment of the present invention is described. It is to be noted that, although description is given in this embodiment by taking a mobile communication system of the LTE system as an example, the present invention is not limited to the example and can be applied to any other mobile communication system.

Figure 1:
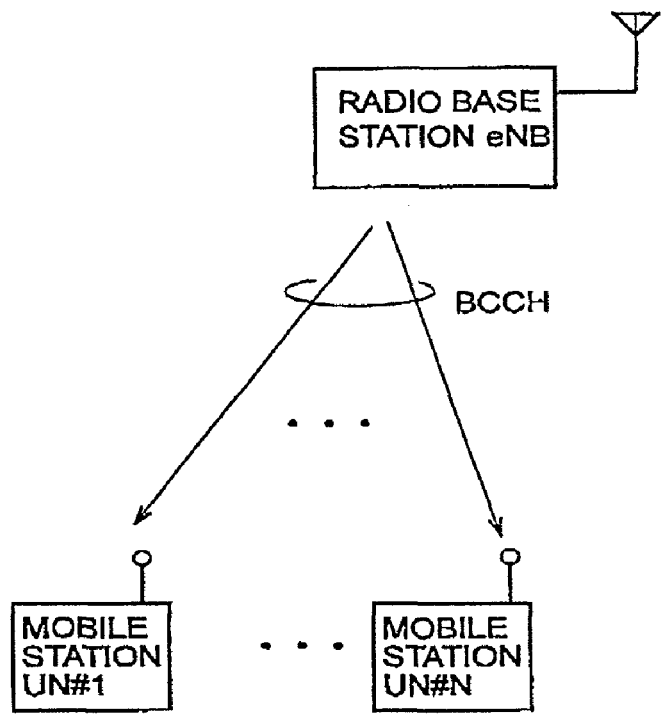
FIG. 1 is a configuration diagram of an entire mobile communication system according to a first embodiment of the present invention.

As shown in FIG. 1, in the mobile communication system according to this embodiment, a mobile base station eNB is configured to divide a BCCH (broadcast information) into multiple segments and repeatedly transmit the multiple segments to multiple mobile stations UE#1 to #N by using multiple subframes.

Figure 2:
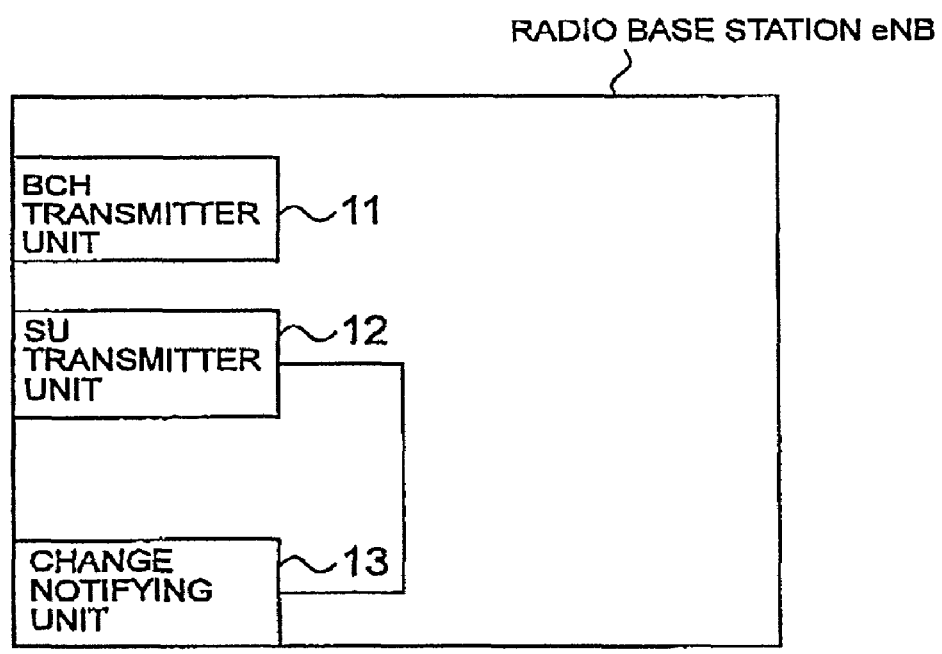
FIG. 2 is a functional block diagram of a radio base station according to the first embodiment of the present invention.

As shown in FIG. 2, the radio base station eNB according to this embodiment includes a BCH transmitter unit 11, a SU transmitter unit 12 and a change notifying unit 13.

Figure 8:
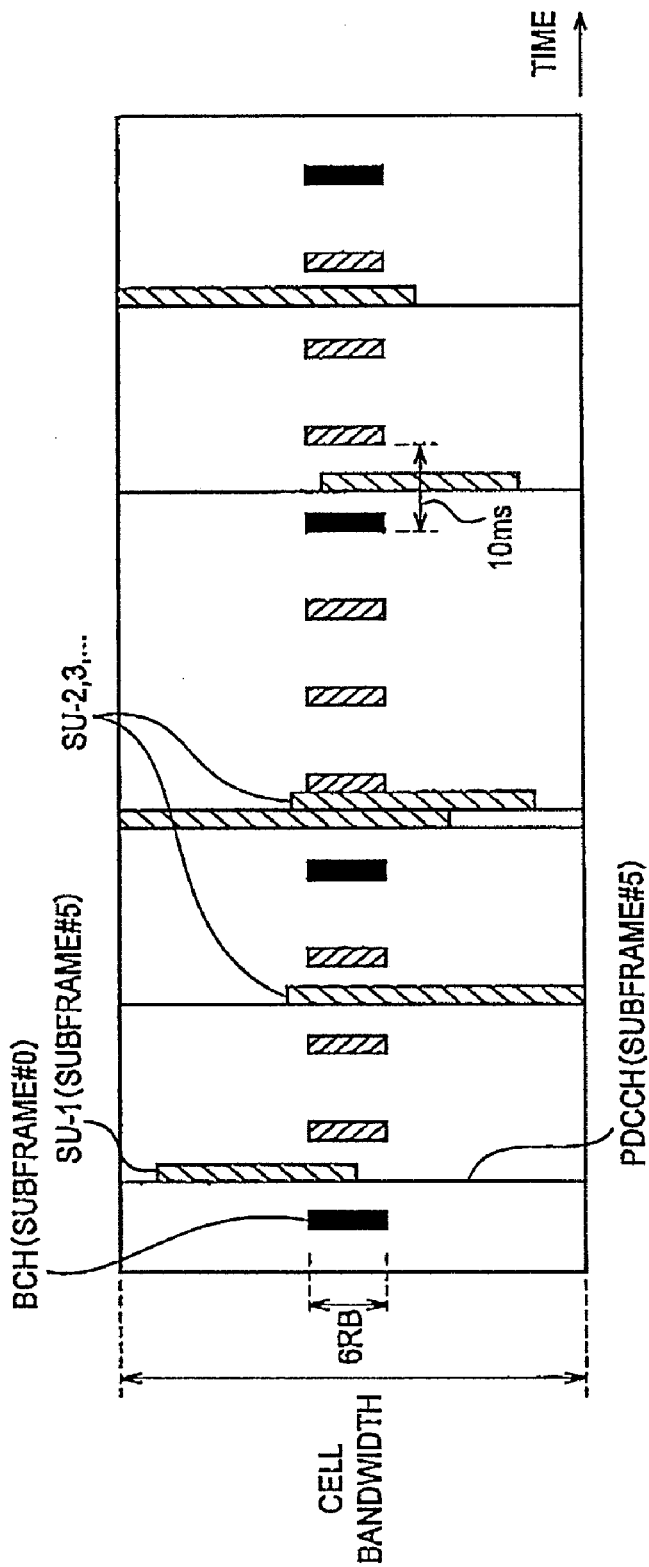
FIG. 8 is a view for explaining a method of transmitting broadcast information in a mobile communication system according to a conventional technique.

As shown in FIG. 8 mentioned above, the BCH transmitter unit 11 is configured to transmit a BCH to which a BCCH (basic information) is mapped.

As shown in FIG. 8 mentioned above, the SU transmitter unit 12 is configured to transmit SUs (SU-1,2,3 and the like) including a BCCH (other than the basic information), through a PDSCH.

Specifically, the SU transmitter unit 12 is configured to transmit the SU-1 including scheduling information of the SUs (called different SUs, below) subsequent to the SU-1, by a subframe #5 of each radio frame through the PDSCH.

The SU transmitter unit 12 is configured to then transmit each of the different SUs through the PDSCH, on the basis of the scheduling information of the different SUs (e.g., the size of the different SU, subframes in which the different SU is to be transmitted, the cycle in which the different SU is to be transmitted, the size of the above-described Window, and the like) specified by the SU-1.

Figure 9:
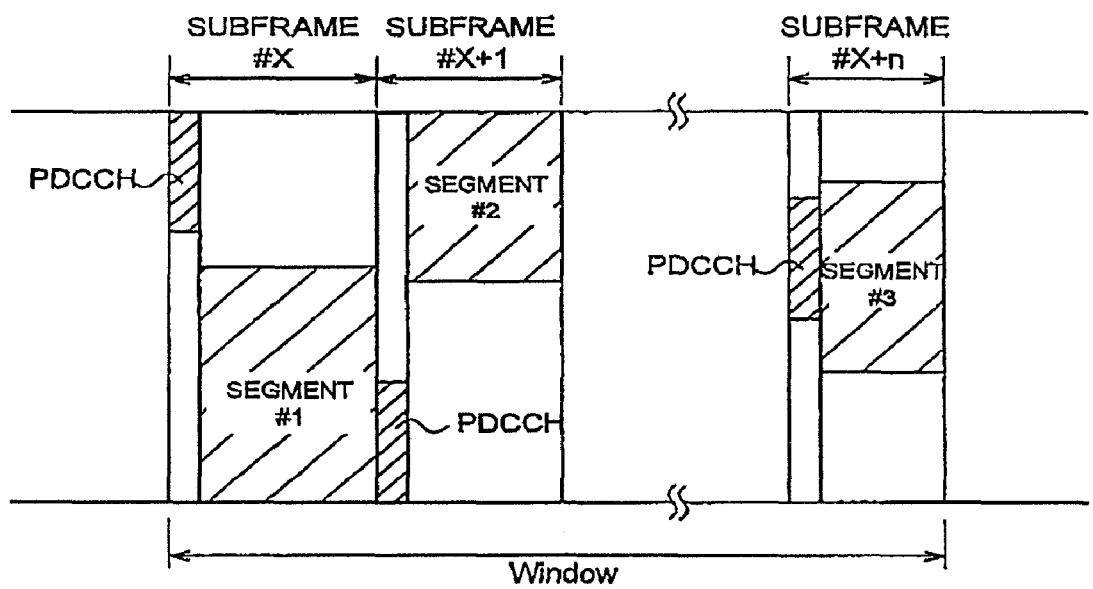
FIG. 9 is a view for explaining a method of transmitting a SU-2 in the mobile communication system according to the conventional technique.

If the different SU cannot be transmitted in 1TTI, the SU transmitter unit 12 is configured to divide the different SU (broadcast information), and then transmit resultant multiple segments by subframes (radio resource blocks) in the Window shown in FIG. 9.

In addition, the SU transmitter unit 12 is configured to repeatedly transmit the multiple segments in a predetermined cycle. This cycle is specified by the scheduling information of the different SUs included in the SU-1.

The SU transmitter unit 12 may be configured to change the size of each of the multiple segments (segmentation method for the corresponding SU) or subframes in which the multiple segments are to be transmitted (mapped) when repeatedly transmitting the multiple segments.

The change notifying unit 13 is configured to transmit a change notification (BCCH Change Notification) to the multiple mobile stations UE#1 to UE#N, when a change has been made to the size of each of the multiple segments or the subframes in which the multiple segments are to be transmitted, while the radio base station eNB is repeatedly transmitting the multiple segments, the change notification indicating the change.

Figure 3:
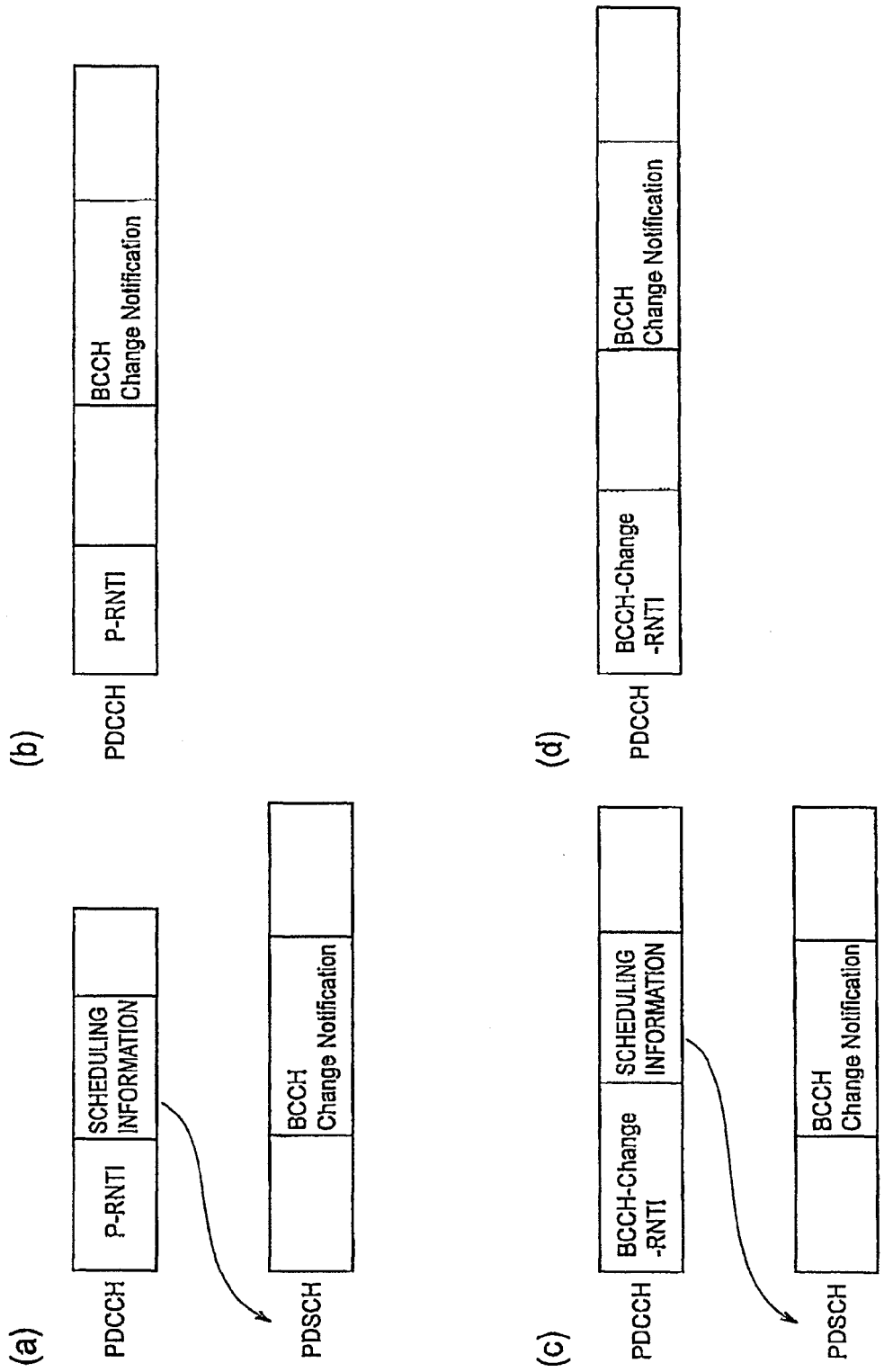
FIG. 3 provides views for explaining a method of transmitting a change notification in the mobile communication system according to the first embodiment of the present invention.

For example, as shown in FIG. 3(*a*), at the timing (in the subframe, Paging Occasion) for transmitting a PCH (paging signal) to the multiple mobile stations UE#1 to UE#N, the change notifying unit 13 may be configured to transmit scheduling information of PDSCH (shared data channel) transmitting the PCH (paging signal), by a PDCCH (control channel) including a P-RNTI (Paging-Radio Network Temporary Identity, radio network identifier for the paging signal), and to then transmit the change notification together with the PCH (paging signal) by the PDSCH (shared data channel) transmitted in radio resource blocks (radio resources) specified by the scheduling information.

Alternatively, as shown in FIG. 3(*b*), at the timing for transmitting a PCH (paging signal) to the multiple mobile stations UE#1 to UE#N, the change notifying unit 13 may be configured to transmit the change notification together with scheduling information of the PDSCH (shared data channel) transmitting the PCH (paging signal) by a PDCCH (control channel) having a specific format and including a P-RNTI (radio network identifier for the paging signal).

Alternatively, as shown in FIG. 3(*c*), at the timing for transmitting a PCH (paging signal) to the multiple mobile station UE#1 to UE#N, the change notifying unit 13 may be configured to transmit scheduling information of PDSCH (shared data channel) transmitting the change notification, by a PDCCH (control channel) including BCCH-Change-RNTI (radio network identifier for the change notification) different from a P-RNTI (radio network identifier for a paging signal), and transmit the change notification by the PDSCH (shared data channel) transmitted in radio resource blocks (radio resources) specified by the scheduling information.

Further alternatively, as shown in FIG. 3(*d*), at the timing for transmitting a PCH (paging signal) to the multiple mobile stations UE#1 to UE#N, the change notifying unit 13 may be configured to transmit the change notification by a PDCCH (control channel) including a BCCH-Change-RNTI (radio network identifier for the change notification) different from a P-RNTI (radio network identifier for a paging signal).

The change notifying unit 13 may be configured to transmit the change notification, by changing a Value Tag included in the BCH or the SU-1.

Here, the change notification may be different from a change notification transmitted when the content (information element) of the BCCH (broadcast information) is changed.

As shown in FIG. 4, the mobile station UE according to this embodiment includes a BCH receiver unit 31, a SU receiver unit 32 and a change notification receiver unit 33.

As shown in FIG. 8 mentioned above, the BCH receiver unit 31 is configured to receive the BCH in a first subframe of each radio frame, the BCH being repeatedly transmitted four times by using six radio resource blocks in a middle part of a cell bandwidth.

During repeating transmission of the multiple segments by the radio base station eNB, the change notification receiver unit 33 is configured to receive a change notification indicating that a change has been made to the size of each of the multiple segments (segmentation method for the corresponding different SU) or subframes in which the multiple segments are to be transmitted (mapped), from the radio base station eNB.

As shown in FIG. 8 mentioned above, the SU receiver unit 32 is configured to receive the SU-1 transmitted in a subframe #5 of each radio frame (e.g., a radio frame of 80 ms) and the different SUs transmitted by using the radio resource blocks based on the scheduling information transmitted in the SU-1.

Here, as shown in FIG. 9 mentioned above, when any of the different SUs is divided into multiple segments, the SU receiver unit 32 is configured to receive the multiple segments transmitted in a predetermined Window.

Specifically, the SU receiver 32 unit is configured to monitor all the PDSCHs transmitted in the predetermined Window, and to receive PDSCHs each notified as transmitting one of the multiple segments.

When a "RLC-UM mode" is applied as the protocol of a RLC layer, the SU receiver unit 32 is configured to judge whether reception of each of the multiple segments is successful or failed, in a MAC layer, the RLC layer or a RRC layer as shown in FIG. 5(*a*).

When a "RLC-TM mode" is applied as the protocol of a RLC layer, the SU receiver unit 32 is configured to judge whether reception of each of the multiple segments is successful or failed, in a MAC layer or a RRC layer as shown in FIG. 5(*b*).

Here, the SU receiver unit 32 is configured to receive again the SUs repeatedly transmitted by the radio base station eNB, when failing to receive the multiple segments.

When the change notification receiver unit 33 has not received any change notification and the SU receiver unit 32 fails to receive only one or some of the multiple segments, the SU receiver unit 32 is configured to receive again only the one or some of the multiple segments.

The SU receiver unit 32 may be configured to receive only the one or some of the segments in the MAC layer by soft combining reception in this event.

Specifically, when the change notification receiver unit 33 has not received any change notification while the radio base station eNB is repeatedly transmitting the multiple segments, the SU receiver unit 32 can judge that a change has not been made to the size of each of the multiple segments (segmentation method for the corresponding different SU) or the subframes in which the multiple segments are to be transmitted (mapped).

The SU receiver unit 32 is configured to receive again all the multiple segments even when failing to receive one or some of the multiple segments, if the change notification receiver unit 33 has received a change notification.

(Operation of Mobile Communication System according to First Embodiment of Present Invention)

An operation of a mobile communication system according to the first embodiment of the present invention is described with reference to FIGS. 6 and 7.

Figure 6:
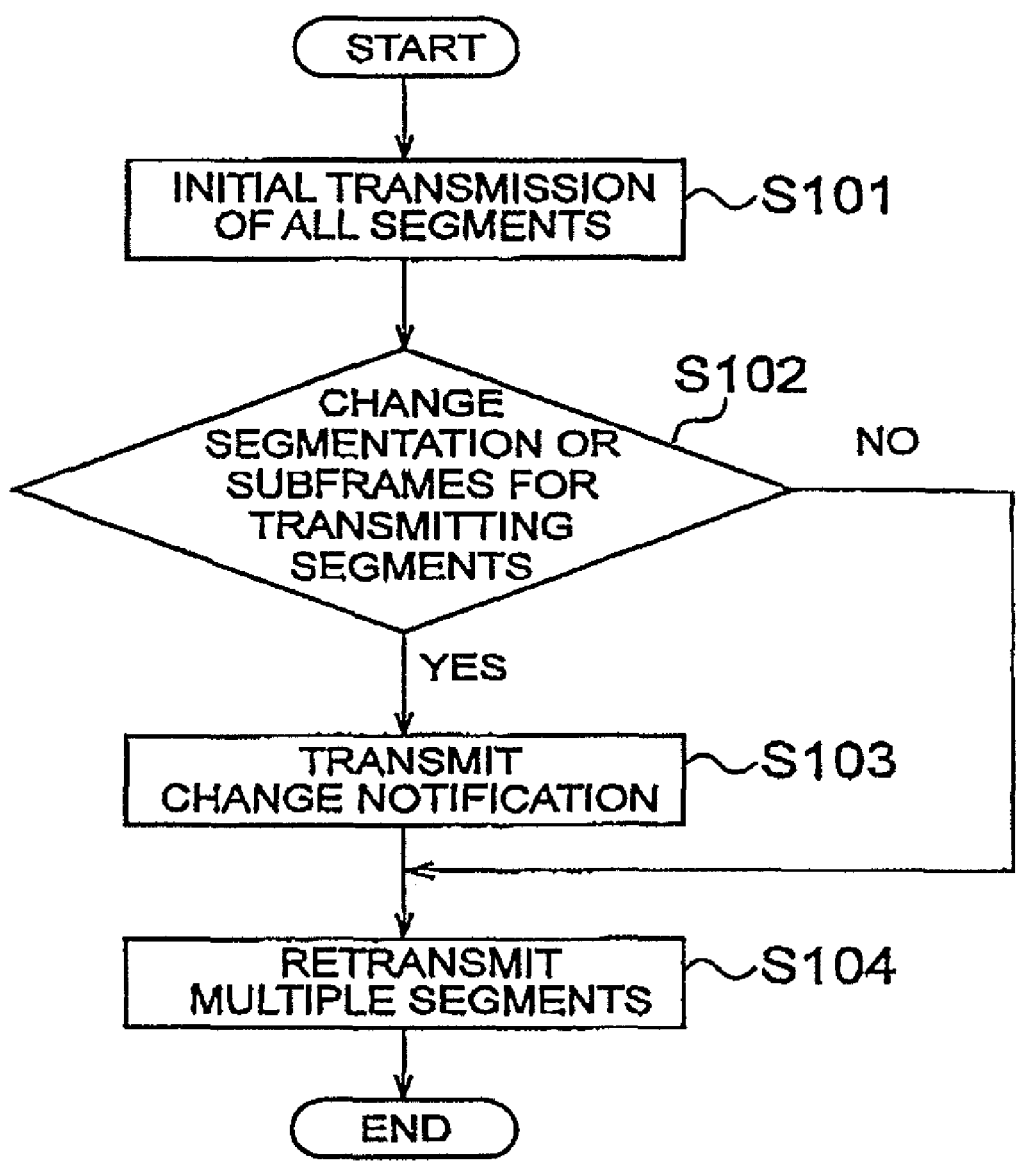
FIG. 6 is a flowchart showing operation of the radio base station according to the first embodiment of the present invention.

Firstly, with reference to FIG. 6, operation of the radio base station eNB according to the first embodiment of the present invention is described.

As shown in FIG. 6, in Step S101, the radio base station eNB divides a different SU (e.g., the SU-2) into multiple segments, and then transmits the multiple segments in a radio resource block (at the timing) specified by the scheduling information included in the SU-1.

In Step S102, in the event of retransmitting the above-described multiple segments, the radio base station eNB judges whether or not to change the size of each of the multiple segments (segmentation method for the different SU) or subframes in which the multiple segments are mapped.

When determining to make the change, the radio base station eNB transmits a change notification for notifying the multiple mobile stations UE#1 to #N of the determination, to the multiple mobile stations UE#1 to #N in Step S103, and then retransmits the multiple segments to which the change has been made, to the multiple mobile stations UE#1 to #N in Step S104.

When determining not to make the change, on the other hand, the radio base station eNB retransmits the multiple segments to the mobile stations UE#1 to #N without transmitting the change notification, in Step S104.

Figure 7:
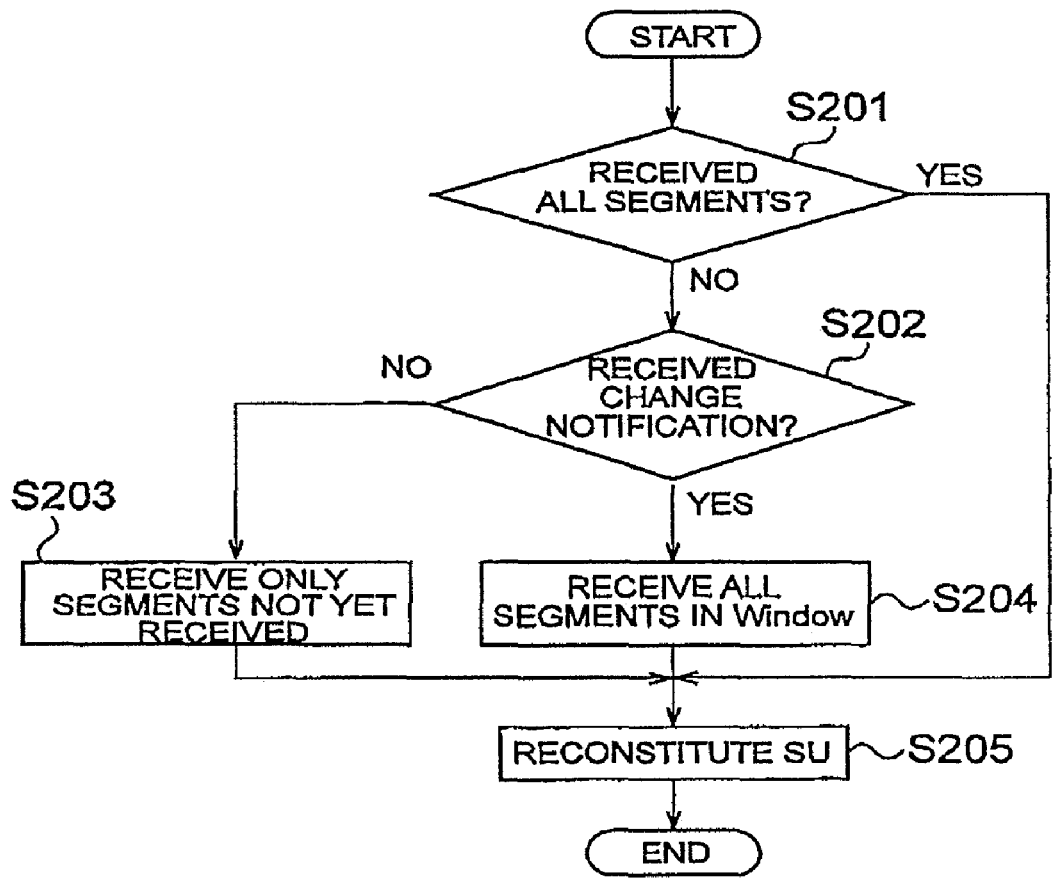
FIG. 7 is a flowchart showing operation of the mobile station according to the first embodiment of the present invention.

Secondly, with reference to FIG. 7, operation of the mobile station UE according to the first embodiment of the present invention is described.

As shown in FIG. 7, in Step S201, when starting to receive the different SU transmitted by the radio base station eNB, the mobile station UE judges whether or not all the segments constituting the different SU have been received, on the basis of the scheduling information included in the SU-1.

The operation advances to Step S205 when the mobile station UE judges that all the segments have been received, while advancing to Step S202 when the mobile station UE judges that one or some of the segments have failed to be received.

In Step S202, the mobile station UE judges whether or not it has received a change notification from the radio base station eNB.

When judging that no change notification has been received, the mobile station UE receives the one or some segments failed to be received in Step S201, in the subframes used in the first transmission of the segments, in Step S203.

When judging that a change notification has been received, on the other hand, the mobile station UE receives all the segments constituting the different SU, instead of only the segments failed to be received in Step S201, in the subframes specified by the scheduling information included in the SU-1, in Step S204.

In Step S205, the mobile station UE reconstitutes the different SU by using the received multiple segments, in the RRC in Step S205.

(Operations and Effects of Mobile Communication System according to First Embodiment of Present Invention)

According to the mobile communication system of this embodiment, when the radio base station eNB repeatedly transmits multiple segments to the multiple mobile stations UE#1 to UE#N by using multiple subframes and any of the mobile stations UE fails to receive one or some of the multiple segments, the mobile station UE can efficiently receive only the segments failed to be received. Thereby, time required to acquire broadcast information can be shortened.

In addition, since the mobile station UE can efficiently recover reception failure, reduction in power for transmitting broadcast information and increase in encoding ratio are possible in the radio base station eNB.

(Modification)

In a mobile communication system according to this modification, a SU transmitter unit 12 of a radio base station eNB is configured to divide "BCCH", which is broadcast information, into "SIs (System. Information Pieces)", which are multiple segments, and to then repeatedly transmit the multiple segments to multiple mobile stations UE by using multiple subframes.

A change notifying unit 13 of the radio base station eNB is configured to transmit a change notification to the multiple mobile stations UE, when the radio base station eNB has changed the content of broadcast information constituted by the multiple segments, the size of each of the multiple segments, or subframes in which the multiple segments are to be transmitted, while the radio base station eNB is repeatedly transmitting the multiple segments, the change notification indicating the change.

Here, a change notification transmitted when a change has been made to the size of each of the multiple segments or subframes in which the multiple segments are to be transmitted may be different from a change notification transmitted when a change has been made to the content of the broadcast information constituted by the multiple segments.

A SU receiver unit 32 of a mobile station UE is configured to receive again all the multiple segments even when failing to receive one or some of the multiple segments, if a change notification receiver unit 33 has received a change notification.

Specifically, the SU receiver unit 32 is configured to receive again all the multiple segments (SIs) constituting the broadcast information (BCCH) corresponding to the state of the mobile station UE (e.g., Idle state or Connected state) or the technology supported by the mobile station UE (RAT (Radio Access Technology) or the like), even when failing to receive only one or some of the multiple segments, if the change notification receiver unit 33 has received a change notification.

Here, the operations of the mobile station UE and the radio base stations eNB may each be implemented by hardware, a software module executed by a processor, or a combination of both.

The software module may be provided in a storage medium in any format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk or a CD-ROM.

The storage medium is connected to the processor so that the processor can read and write information from and into the storage medium. Moreover, the storage medium may be integrated into the processor. Additionally, the storage medium and the processor may be provided in an ASIC. The ASIC may be provided in a corresponding one of the mobile station UE and the radio base station eNB. Alternatively, the storage medium and the processor may be provided in a corresponding one of the mobile station UE and the base station eNB, as discrete components.

Hereinabove, the present invention is described in detail by using the above-described embodiment. However, it is apparent to those skilled in the art that the present invention is not to be limited to the embodiment described in this description. The present invention can be implemented as a modified or changed mode without departing from the spirit and scope of the present invention defined by the description in the scope of claims. Hence, what is described in this description is for illustrative purpose, and is not intended to impose any limitation on the present invention. The entire content of Japanese Patent Application No. 2007-241652 (filed on Sep. 18, 2007) is incorporated in this description by reference.

Industrial Applicability

As described above, the present invention can provide a broadcast information transmission method, a radio base station and a mobile station which make it possible that, when the radio base station repeatedly transmits multiple segments to multiple mobile stations by using multiple subframes and any of the mobile stations fails to receive one or some of the multiple segments, the mobile station can efficiently receive only the one or some segments failed to be received.

The invention claimed is:

1. A broadcast information transmission method in which a radio base station divides broadcast information into a plurality of segments and repeatedly transmits the plurality of segments to a plurality of mobile stations by using a plurality of subframes, the broadcast information transmission method comprising the steps of:
   transmitting, at the radio base station, a change notification to the plurality of mobile stations, when repeatedly transmitting the plurality of segments, and when having changed a content of the broadcast information formed of the plurality of segments, size of each of the plurality of segments or subframes in which the plurality of segments are to be transmitted, the change notification indicating the change; and
   receiving, at the mobile station, all the plurality of segments again when having received the change notification.

2. A radio base station configured to divide broadcast information into a plurality of segments and repeatedly transmit the plurality of segments to a plurality of mobile stations by using a plurality of subframes, the radio base station comprising:
   a change notifying unit configured to transmit a change notification to the plurality of mobile stations, when the radio base station repeatedly transmits the plurality of segments, and when the radio base station has changed a content of the broadcast information formed of the plurality of segments, size of each of the plurality of segments or subframes in which the plurality of segments are to be transmitted, the change notification indicating the change,
   wherein at a timing of transmitting a paging signal to the plurality of mobile stations, the change notifying unit is configured to transmit scheduling information of a shared data channel for transmitting the paging signal, by a control channel including a radio network identifier for the paging signal, and to transmit the change notification together with the paging signal, by the shared data channel transmitted in a radio resource specified by the scheduling information.

3. A mobile station configured to repeatedly receive a plurality of segments from a radio base station by using a plurality of subframes, the plurality of segments being obtained by dividing broadcast information, the mobile station comprising:
   a change notification receiver unit configured to receive a change notification from the radio base station, when the radio base station repeatedly transmits the plurality of segments, the change notification indicating that a change has been made to size of each of the plurality of segments or subframes in which the plurality of segments are to be transmitted; and
   a segment receiver unit configured to receive again all the plurality of segments when the change notification receiver unit has received the change notification.

4. The mobile station according to claim 3, wherein
   the segment receiver unit is configured to receive again only some of the plurality of segments, when the change notification receiver unit has not received the change notification, and when the segment receiver unit has failed to receive only some of the plurality of segments,
   wherein the change notification is different from a change notification transmitted when a content of the broadcast information is changed, and
   wherein the segment receiver unit is configured to receive again all the plurality of segments forming the broadcast information corresponding to a state of the mobile station or a technology supported by the mobile station, when the segment receiver unit has failed to receive only some of the plurality of segments, and when the change notification receiver unit has received the change notification.

* * * * *